United States Patent
Kneip et al.

(10) Patent No.: US 8,522,491 B2
(45) Date of Patent: Sep. 3, 2013

(54) SUPPORT DEVICE FOR MOUNTING A SOLAR PANEL AND MOUNTING SYSTEM INCORPORATING SAME

(75) Inventors: Johannes Kneip, Radeberg (DE); Miro Bjelobrk, Bremen (DE)

(73) Assignee: Centrosolar AG, Hamburg (DE)

( * ) Notice: Subject to any disclaimer, the term of this patent is extended or adjusted under 35 U.S.C. 154(b) by 0 days.

(21) Appl. No.: 13/076,936

(22) Filed: Mar. 31, 2011

(65) Prior Publication Data

US 2012/0036799 A1    Feb. 16, 2012

(30) Foreign Application Priority Data

Aug. 12, 2010  (EP) .................................... 10008425

(51) Int. Cl.
*E04D 13/18*   (2006.01)
(52) U.S. Cl.
USPC ....................................................... 52/173.3
(58) Field of Classification Search
USPC ....... 52/173.3, 173.1, 475.1, 653.1; 126/623; 248/364, 910, 346.2
See application file for complete search history.

(56) References Cited

U.S. PATENT DOCUMENTS

| | | | | |
|---|---|---|---|---|
| 2,818,254 A | * | 12/1957 | Dunn | 473/481 |
| 4,226,256 A | * | 10/1980 | Hawley | 136/244 |
| 5,228,924 A | * | 7/1993 | Barker et al. | 136/246 |
| 6,113,054 A | * | 9/2000 | Ma | |
| 6,809,251 B2 | * | 10/2004 | Dinwoodie | 136/251 |
| 8,245,459 B2 | * | 8/2012 | Belikoff et al. | 52/173.3 |
| 8,272,176 B2 | * | 9/2012 | Wallgren | 52/173.3 |
| D671,885 S | * | 12/2012 | Steinau | D13/102 |
| 2008/0210221 A1 | * | 9/2008 | Genschorek | 126/704 |
| 2009/0266352 A1 | * | 10/2009 | Wetmore | 126/571 |
| 2009/0320904 A1 | * | 12/2009 | Botkin et al. | 136/251 |
| 2010/0147359 A1 | | 6/2010 | Harberts et al. | 136/246 |

(Continued)

FOREIGN PATENT DOCUMENTS

DE   102007014165        8/2008
DE   202008009134 U1    12/2008

(Continued)

OTHER PUBLICATIONS

European Search Report relating to European Patent Application No. 10008425.0, mailed Mar. 17, 2011, 9 pages.

*Primary Examiner* — Mark Wendell
*Assistant Examiner* — Keith Minter
(74) *Attorney, Agent, or Firm* — Seed IP Law Group PLLC (57) ABSTRACT

The invention provides a solar panel mounting system for mounting one or more solar panels, the system comprising: at least one support device for supporting the solar panel thereon, and at least one flexible fastening member. The support device comprises: a base adapted to seat stably on a substantially flat rooftop surface, the base having at least one recess for receiving ballast to stabilize the support device on the surface; and a mounting frame upstanding from the base and integral therewith, the mounting frame being configured to support the solar panel such that said panel slopes downwardly towards a front edge region of the base. The flexible fastening member is adapted to engage and to extend from the support device, and has an attachment portion which is adapted to be secured to a rooftop surface. Typically, a plurality of the support devices are arranged spaced apart and essentially parallel to one another side-by-side in one or more rows for receiving and supporting a solar panel extending between adjacent pairs of the support devices. Furthermore, a flexible fastening member preferably engages and extends from each of the front and rear edge regions of each support device.

13 Claims, 5 Drawing Sheets

(56) References Cited

FOREIGN PATENT DOCUMENTS

| | | |
|---|---|---|
| DE | 202008014174 U1 | 2/2009 |
| DE | 202009006728 U1 | 1/2010 |
| EP | 1267418 | 12/2002 |
| WO | 03/044299 | 5/2003 |
| WO | 2009/095273 | 8/2009 |
| WO | 2009/114730 | 9/2009 |

* cited by examiner

SUPPORT DEVICE FOR MOUNTING A SOLAR PANEL AND MOUNTING SYSTEM INCORPORATING SAME

TECHNICAL FIELD

The present invention relates to a support device for mounting a solar panel and to a solar panel mounting system that incorporates such a device. A method of mounting a solar panel according to the invention is also described.

The support device of the present invention and the associated mounting system are particularly suitable for use in mounting solar panels on flat rooftops covered with a sealing layer, such as a polymeric, bituminous, or tar-based membrane, and it will be convenient to describe the invention in this exemplary context. It will be appreciated, however, that the support device and mounting system of the invention may also be suitable for use on other types of rooftops or supporting structures.

BACKGROUND OF THE INVENTION

As a result of an increasing trend towards the adoption of renewable energy sources, the installation of solar panels, and in particular arrays of photo-voltaic (PV) panels, is gaining in popularity, not only for industrial and institutional applications, but also in the domestic and rural environments. Whether for the industrial, institutional, domestic or rural environment, the solar panels are often mounted on the rooftops of buildings—most typically in the area where the solar energy is required. Roof structures are particularly convenient for this purpose as they present a large surface area directed towards the sun and are often largely out of view from the normal visual perspective, thereby rendering the installations relatively unobtrusive. Generally horizontal or flat rooftops are particularly convenient for this purpose as they provide an even and stable working environment for the assembly, installation and maintenance of a solar panel array. In this connection, it will be noted that even "flat" or substantially horizontal rooftops will often have a slight grade or slope from a few degrees up to about 10° to promote rainwater drainage.

In many cases, horizontal or flat rooftops have a sealing layer as an outer covering and this sealing layer is typically formed by a flexible membrane of a rubber-based or polymer material, sometimes including bituminous or tar-based compounds. In particular, the sealing layer or "skin" of flat rooftops is often formed by one or more sheets of a flexible material selected from the group including thermoplastic poly-olefins (TPOs) or flexible polyolefins, flexible polyolefin alloys (FPA), ethylene-propylene-diene M-class rubber (EPDM), poly-vinylchloride (PVC) and polymer-bitumen sheeting. Some of these materials have been in use in roofing structures since the 1960's and, as such, are commonly found on the rooftops of existing buildings today.

Such rooftops present particular problems in the mounting of solar panel arrays because it is especially important to ensure that the outer sealing layer or membrane of the rooftop remains intact and that no, or only minimal, perforation or penetration of the sealing layer occurs. In this regard, the flexible outer layer or membrane serves to ensure a seal against the ingress of water into the roof structure. Accordingly, every time the outer sealing layer or membrane sustains a perforation or puncture, the waterproof properties of the membrane are compromised and a potential source of rainwater leakage or seepage into the roof is created.

One of the known techniques for mounting of solar panel arrays on such flat rooftop surfaces includes the use of elongate bearing rails as the basic carrier elements for the solar panel array. The bearing rails typically have a constant profile or cross-section (typically provided as a so-called "cap"-section or "hat"-section) and have conventionally been fastened or secured on the sealed outer surface of the rooftop in a number of different ways, including being held down with weights or ballast, bolts and screw fasteners, adhesive and solvent bonding, and cold or hot fusion or welding. These techniques have disadvantages, however.

The use of weights or ballast, for example, is not suitable for all rooftops because it can substantially increase the loading on the roof structure and many rooftops are simply not designed to carry substantially increased static loads, particularly in view of the fact that wind forces will additionally load the structure. Furthermore, the transportation of large amounts of ballast can also be cumbersome. Moreover, mounting systems using weights or ballast as main fixation means are frequently of tub-like shape associated with large material consumption resulting in inadequate material and transportation costs. Furthermore, such structures cover a large area of the roof, which is often not desirable because this hinders the free drainage of water on the roof.

Bolts and screw fasteners, on the other hand, have the disadvantage that they penetrate the roof "skin" or sealing layer, which—as noted above—carries the inherent risk of a possible subsequent seepage or leakage of water into the roof structure. This risk is further heightened in the event that the solar panel array ever needs to be disassembled and removed from the rooftop.

Adhesive bonding and solvent bonding have the disadvantage of relatively low bond durability and can also not be employed for all types of conventional sealing layer or sealing sheet material. On the other hand, the technique discussed in German utility model DE 20 2008 209 134 U1, which describes the use of cold fusion or welding to secure the bearing rails to the roof surface, requires that the bearing rails first be coated with a material that corresponds to the sealing layer (e.g. PVC, TPO, EPDM, etc.), which can be extremely time- and cost-intensive. Furthermore, hot fusion or welding with a heating device in that arrangement can be difficult due to the rigidity of the rails and can lead to irregular bonding and associated failures.

The above fixation techniques can also have the disadvantage that forces generated due to thermal expansion of the solar panel modules arranged on and/or extending between the rail sections, have to be fully absorbed by the join between the rail and the roof sealing layer. With significantly different coefficients of thermal expansion between the roof structure and the solar modules, overloading or even tearing of the sealing layer can result.

In view of the above issues associated with mounting solar panel arrays on rooftops sealed with a polymer or rubber-based sheet layer or membrane, it is an object of the present invention to provide a new and improved mounting system with which one or more of these problems may be overcome or at least minimized. It is also an object of the invention to provide a new and improved support device for use in such a mounting system.

SUMMARY OF THE INVENTION

In one aspect, the present invention provides a support device for mounting a solar panel, the support device comprising: a base for seating on a substantially horizontal surface, such as a flat rooftop; and a panel mounting frame which is upstanding from the base and is preferably formed integral with the base. The mounting frame is configured to support a solar panel such that the panel slopes downwardly towards a front edge of the base. The base includes at least one recess for receiving ballast to stabilise the support device on the rooftop surface. Further, the base is configured to engage and/or to secure a flexible fastening member preferably extending from an edge region thereof for attachment to the rooftop surface. Preferably, the support device further comprises a flexible fastening member.

In the context of the present invention, a base which is configured to engage a flexible fastening member also includes a base which is configured to allow a flexible fastening member to extend through the base.

In a preferred embodiment, the support device comprises only a single mounting frame, which is preferably essentially centrally located within the base. Preferably, the mounting frame comprises a rear strut or wall member that projects upwardly from the base, and at least one bearing member that is configured to bear the solar panel. The bearing member may extend from an upper end region of the rear strut member, and is desirably angled downwards towards the front edge region of the base.

In a preferred form of the invention, an edge region of the base is configured to engage and secure one or more flexible fastening members. In particular, front and rear edge regions and/or lateral side edge regions of the base of the support device may be adapted to engage and secure a respective flexible fastening member, e.g. via a physical connection. In this regard, one or more of the edge regions of the base of each support device preferably includes a peripheral flange for fixing a respective flexible fastening member, e.g. by means of fixation elements, such as rivets, screws, or adhesive connection. The edge regions may include a bar, loop, or hook and/or one or more pins, bolts, spikes, or studs for attachment of the fastening member. In a particularly advantageous embodiment, the front and rear edge regions of the base are adapted to secure the respective flexible fastening member. The fastening members may alternatively and/or additionally engage and extend from lateral side regions of the base. It is particularly preferred that at least the rear edge region of the base is adapted to engage and secure the respective flexible fastening member. The flexible fastening members may also extend over and/or through the base, e.g. through one or more apertures provided in the base, to engage and securely hold the support device in this fashion.

In a preferred form of the invention, each flexible fastening member is configured or arranged to extend from a respective edge region of the base such that an attachment portion of that fastening member is arranged outside a plan or vertical projection of the base onto the rooftop surface. Thus, the attachment portion is preferably arranged for attachment to the rooftop surface next to or adjacent to the base of the support device, e.g. at the longitudinal end regions of the base. The attachment portion of the flexible fastening member is desirably adapted to be secured to the rooftop surface, in particular to a waterproof layer or membrane of the rooftop surface, without penetrating same; for example by adhesive bonding or by fusion or welding (e.g. hot or cold welding). As such, the portion of the flexible fastening member secured to the front or rear edge region of the base engages the support device to hold or "strap" it securely to the roof.

In a preferred form of the invention, each of the flexible fastening members is formed at least partially, and preferably substantially entirely, as a flexible web of material that may be compatible for adhesive or fusion bonding with the rooftop surface. The flexible web of material may, for example, comprise any one of TPO, FPA, EPDM, PVC and/or a bituminous polymer. In this connection, the material of the fastening members may be selected depending upon the material of the outer sealing layer or membrane on the rooftop and/or the type of bonding or welding to be used. In a particularly preferred embodiment, each of the flexible fastening members is in the form of a fastening strap.

Thus, the fastening strap may comprise a flexible web of any suitable size and shape for performing the desired function; i.e. it may be relatively long and narrow, or it may even be generally square or sheet-like. The decisive aspect in this respect is that the dimensions enable the fastening strap to perform the intended fastening function with the support device. The attachment portion of each fastening strap is desirably provided at an end region or at each end region of the strap and presents an area for adhesion or fusion bonding with the rooftop surface. It will be noted, however, that the invention also contemplates embodiments in which each of the flexible fastening members is only partially flexible, i.e. includes a substantially rigid portion, or in which each of the fastening straps is formed from a substantially rigid material. In such embodiments, the fastening straps may nevertheless still be suitable to be secured to the rooftop surface by adhesive bonding or by fusion or welding (e.g. hot or cold welding).

It is particularly preferred that the base, preferably one or more edge regions of the base, such as the front edge region, the rear edge region, or one or both of the lateral side edge regions, is/are configured to allow one or more flexible fastening members, for example, one or more fastening straps, to extend through the base, preferably, to engage and/or securely hold the support device in this fashion, for example, on a rooftop. To this end, the base preferably comprises means allowing a flexible fastening member to extend through the base. Such means could provide one or more permanently or temporarily open apertures, for example, openable clamps or clips, or permanent or temporary holes or openings within the base.

The term "the base is configured to allow a flexible fastening member to extend through the base" means that the base is configured such that a flexible fastening member is able to extend across the base. In the context of the present invention, said term preferably means that one or more edge regions of the base, such as the front edge region, the rear edge region, and/or one or both of the lateral side edge regions, preferably the front edge and/or the rear edge region, more preferably at least the rear edge region, is/are configured to allow a flexible fastening member to extend through the base.

Preferably, the term "the base is configured to allow a flexible fastening member to extend through the base" means that the base is configured such that a flexible fastening member is able to be threaded, slid, or slipped through the base. To this end, the base comprises one or more means allowing a flexible fastening member to be threaded, slid, or slipped through the base, preferably through one or more of the edge regions as described above. For example, the base may comprise one or more apertures or openings through which the fastening member could be threaded, slid, or slipped, preferably such that fixation of the such positioned fastening member on a surface, such as a rooftop, securely holds the support device on said surface. For example, fixation of both ends of a fastening strap which is threaded, slid, or slipped through the base on a surface would securely hold the support device on said surface.

The one or more means allowing a flexible fastening member to be threaded, slid, or slipped through the base, such as one or more apertures or openings, may be directly formed within the material of the base, for example, as a gap in the material forming the support device. Alternatively, the base may comprise one or more further elements which form one or more apertures or openings, such as a one or more hangers, loops, kinks, nooses, backstraps, hoops, holders, ears, eyes, bails, hooks, or bars and the like.

Preferably, the one or more means allowing a flexible fastening member to extend through the base, preferably to be threaded, slid, or slipped through the base, such as one or more apertures or openings, are positioned at the front edge region, the rear edge region, and/or one or both of the lateral side edge regions of the base. Preferably, said means are at least positioned at the rear edge region. Preferably, said means are positioned within one or more peripheral flanges positioned at the front edge region, the rear edge region, and/or one or both of the lateral side edge regions of the base.

The one or more means allowing a flexible fastening member to extend through the base, preferably to be threaded, slid, or slipped through the base, such as one or more apertures or openings, may have any shape, for example, rectangular, square, round, oval, slot-like etc. For example, said means result in a bar-like structure around which the flexible fastening member can be slipped or bent. Preferably, said means are configured such that there are no or essentially no shearing forces exerted on a fastening strap bent around a structure, such as a bar, resulting from said means, e.g., from the aperture.

Furthermore, said means, for example, the one or more apertures or openings, may be oriented in any orientation relative to the base. It is however preferred that said means are oriented within or on the base such that the support device can be conveniently and/or securely fixed to a surface, such as a rooftop, by fixation of a flexible fastening member which extends through the base on said surface. For example, it is preferred that said means are positioned towards, i.e., close to the ground-facing side of the base, preferably one or more edge regions of the base.

The one or more means allowing a flexible fastening member to extend through the base, preferably to be threaded, slid, or slipped through the base, such as one or more apertures or openings, may also include means which allow the fixation of the flexible fastening member to the base, such as one or more clamps, clips, bolts, pins, studs or the like. The flexible fastening member can be additionally or alternatively be fixed to the base by welding, bonding, fusing, adhesive bonding, gluing etc. of the fastening member to the base material.

In a preferred embodiment of the invention, the support device further comprises a flexible fastening member as described above. Preferably, the flexible fastening member is configured to extend through the base. Preferably, the flexible fastening member, for example, one or more fastening straps, extends through the base, preferably via means allowing a flexible fastening member to extend through the base as described above. Thus, in a particular preferred embodiment, the flexible fastening member extends through one or more apertures or openings as described above, for example, positioned at the front edge region, the rear edge region, and/or one or both of the lateral side edge regions of the base.

The term "extending through the base" or "extending across the base" in the context of the present invention preferably means that the flexible fastening member is threaded, slid or, slipped through the base, preferably through one or more apertures or openings formed within the base or formed by additional elements as described above. For example, the flexible fastening member may be threaded, slipped, or slid from top to bottom or from the vertical front or sides of the front and/or rear edge region to the bottom depending on the position and orientation of the means allowing a flexible fastening member to be extended through the base.

Preferably, the fastening member is bent over a bar-like structure which is formed within the base by an aperture, for example, positioned at the front edge region, the rear edge region, and/or one or both of the lateral side edge regions of the base. Preferably, the flexible fastening member forms a flap which is preferably bent through an aperture as defined above, preferably, such that both ends of the flexible fastening member, for example, one or more fastening straps, extend from the base. The ends of the flexible fastening member, e.g., of the fastening strap(s), may extend from the base in any direction, for example, in parallel, preferably, on top of each other, or in different directions at any angle. For example, one end may extend away from the base and the other end may extend towards the centre of the base, for example, underneath the base. It is particularly preferred that both ends of the fastening member extend away from the base such that the ends are arranged outside a plan or vertical projection of the base onto a surface on which the base is positioned. Preferably, the ends of the flexible fastening member are arranged on top of each other and are preferably both used for fixing the support device to a surface. For example, both ends of the fastening member are fixed to a rooftop surface by adhesive bonding or by fusion or welding (e.g. hot or cold welding).

Preferably, both ends of the flexible fastening member, for example, the one or more fastening straps, comprise an attachment portion as described above. Thus, the attachment portion of each end is preferably arranged for attachment to the rooftop surface next to or adjacent to the base of the support device, e.g. at the longitudinal end regions of the base.

In a preferred form of the invention, the at least one ballast-receiving recess can be formed as a chamber or cavity, which is preferably upwardly open for filling with the ballast from above. The ballast-receiving recess can be located in any position within the base. In one embodiment, the ballast-receiving recess is arranged at a lateral side of the mounting frame, and desirably has a generally elongate form which extends between front and rear edge regions of the base. In a preferred embodiment, the support device has a pair of ballast-receiving recesses respectively arranged at laterally opposite sides of the mounting frame, which itself is preferably arranged substantially centrally of the base. The base of the support device may have a generally flat underside and/or footings for seating stably on the rooftop surface, and each ballast-receiving recess may have a tray- or trough-like configuration. That is, each ballast-receiving recess is desirably in the form of a shallow rectangular tray or trough which may be filled, for example, with gravel or stones (e.g. paving stones) to stabilise the support device on the rooftop surface. In an alternative configuration, each ballast-receiving recess may comprise a chamber or cavity that is formed as a tank, e.g. a substantially enclosed tank, for receiving and holding a liquid, such as water, or other "pourable" ballast, such as sand or gravel.

In a particularly preferred embodiment of the invention, the at least one ballast-receiving recess is located essentially centrally within the base. The term "located essentially centrally" in this context preferably means located essentially centrally with respect to the lateral sides, for example, the distance from the left lateral side of the ballast-receiving recess to the left lateral side of the base is approximately equal to the distance of the right lateral side of the ballast-receiving recess to the right lateral side of the base. Since the mounting frame itself is preferably arranged substantially centrally of the base, preferably in a lateral perspective as described above, the term "located essentially centrally" preferably means located within an area of the vertical projection of the mounting frame onto the base, e.g., at least part of the recess is located beneath the bearing member of the mounting frame.

Preferably, there are no further ballast-receiving recesses on a lateral side of the mounting frame if a ballast-receiving recess is located essentially centrally within the base. In one embodiment, the base essentially consists of a ballast-receiving recess. In one embodiment, the ballast-receiving recess, preferably the essentially centrally located ballast receiving recess, is the base. The possibility for arranging ballast essentially centrally within the base allows constructing a space-saving support device, and thus, to reduce material consumption, manufacturing and transportation costs.

The ballast-receiving recess in this embodiment may have the same form or configuration as described above for ballast-receiving recesses arranged on a lateral side of the mounting frame. Preferably, the recess is shallow, e.g., side walls of the recess are low in height compared to the height of the support device. For example, the height of the support device (from the highest point, e.g., the upper end of the bearing member, to the bottom of the base) may be 5- to 10-fold the height of the side walls of the recess. In one embodiment, the height of the recess equals the height of the base. Furthermore, the recess is preferably upwardly open for filling with the ballast from above.

In one embodiment, one or more walls of the recess, for example, one or both of the lateral side walls, the rear edge wall or the front edge wall, are adapted to secure the ballast within the recess. For example, one or more walls of the recess, for example, one or both of the lateral side walls, the rear edge wall or the front edge wall may comprise one or more means for securing the ballast within the recess, for example, one or more hook-like structures. For example, the ballast within the recess may be secured to said means using one or more bands, lashes, strings, or wires. Such band, lash, string, or wire may, for example, be connected to the ballast or wrapped around the ballast and secured to the one or more means for securing the ballast within the recess, for example, to the one or more hook-like structures. This embodiment provides the advantage that tipping, for example, lateral tipping, of the ballast from the recess is prevented.

In a particularly preferred embodiment, the ballast-receiving recess, preferably the essentially centrally located ballast-receiving recess, further comprises an opening at an underside of the recess, e.g., within the ground-facing side of the recess. Preferably, the recess comprising an opening at an underside is configured to receive ballast for stabilizing the support device on a surface, for example, on a rooftop. Thus, preferably, the recess comprising an opening at an underside, preferably its ground-facing side, comprises a ballast-bearing surface. Thus, it is particularly preferred that the opening at an underside of the recess does not extend throughout the entire recess or its ground-facing side. For example, the opening may extend from the rear to the front edge of the recess, but only partially extend from one lateral side to the other, or the opening may extend from one lateral side to the other, but only partially extend from the rear to the front edge of the recess, or the recess comprises a frame along its edges, or the ground-facing side of the recess comprises or consists of a frame along the edges of the recess, or the recess or its ground-facing side comprises or consists of elements protruding from the edges towards the centre of the recess etc.

It is particularly preferred that the recess comprising an opening at an underside is configured such that a support device comprising such recess is able to receive and nest with an identical support device when one support device is stacked upon the other. Thus, preferably, the opening at an underside of the recess is sized and arranged to receive—at least partially—the mounting frame of an identical support device when stacked on top of each other. In a preferred embodiment, the dimensions of the opening at an underside of the recess are at least the dimensions of the vertical projection of the mounting frame, preferably the vertical projection of the bearing member of the mounting frame.

Preferably, the dimensions of the opening at an underside of the recess are about the dimensions of the vertical projection of the mounting frame, preferably the vertical projection of the bearing member of the mounting frame, wherein "about the dimensions" in this context preferably means ± up to 20%. Thus, e.g., the dimensions of the opening equal the dimensions of the vertical projection of the mounting frame, preferably the vertical projection of the bearing member of the mounting frame, ±2, 4, 6, 8, 10, 12, 14, 16, or 18%.

In one embodiment, the recess comprising an opening at an underside, e.g., its ground-facing side, may be configured to be covered by a covering means, preferably having solid consistency, such as a plate, tray, trough, etc., for example, made of plastics or metal or the like. The covering means is preferably configured to equally distribute the weight load of ballast placed onto said covering means on the surface on which the support device is mounted, such as a rooftop. Preferably, the dimensions of the covering means slightly exceed the dimensions of the opening at an underside of the recess. Preferably, the covering means rests at least on opposite sides of the ballast-bearing surface within the recess, e.g. within the ground-facing side of the recess. Thus, in one embodiment, the support device further comprises covering means as described above.

The combination of central ballast loading, e.g., underneath the bearing member of the mounting frame with the provision of an opening at an underside of the ballast-receiving recess provides the advantage of nestable stacking of the support devices as well as reduced material consumption and thus for allows for cost-effective production and convenient transportation of such support devices.

The weight of the ballast contributes to maintaining a stable positioning of the solar panel and support device on the rooftop, despite the action of wind forces exerted on the assembly. In the present case, however, the size of each ballast-receiving recess is preferably kept relatively small to avoid an excessive additional loading of the roof structure. The preferred narrow configuration of each recess or chamber also confers the support device with a space-saving design which is particularly useful in allowing compact transport of multiple support devices for a large solar panel array. This advantage is particularly prominent for the above described embodiment combining central ballast loading with the provision of an opening at an underside of the ballast-receiving recess.

In a preferred embodiment of the invention, the mounting frame includes a rear strut or wall member that projects upwardly from the base, and at least one bearing member that is configured to bear the solar panel. The bearing member may extend from an upper end region of the rear strut member, and is desirably angled downwards towards the front edge region of the base. In this regard, the bearing member may present an elongate bearing surface, upon which an edge of the solar panel may be placed, the bearing surface preferably being substantially flat and straight.

Further, the bearing member may include means for rigidly securing the solar panel to the support device. For example, one or more aperture or hole may be formed in the bearing member for receiving a fixation device, such as a clamp or bolt arrangement, for securing an edge of the solar panel to the support device. Thus, the solar panel may be directly secured to the support device, preferably to the bearing member. However, the solar panel could also be indirectly connected and/or secured to the support device, for example, by using carrier means, such as one or more rails, beams, girders, belts, plates or trays or the like, which is/are directly or indirectly, preferably directly, secured to the support device, for example, to the bearing member of the mounting frame, using fixation means such as a clamp or a bolt arrangement. The solar panel is then secured directly or indirectly, preferably directly, to the carrier means. The carrier means may include means for rigidly securing the solar panel to the carrier means. For example, one or more apertures or holes may be formed in the carrier means for receiving a fixation device, such as a clamp or bolt arrangement, for securing the solar panel, for example, the edge of the solar panel, to the carrier means.

Thus, preferably, the support device is configured to secure one or more carrier means, preferably to the mounting frame, preferably to the bearing member of the mounting frame as described above. Preferably, the carrier means are rails or beams which are preferably configured to extend between two or more support devices. In one embodiment, the support device comprises one or more carrier means as described above.

The carrier means may be secured to the support device in any possible orientation. Preferably, the carrier means is secured to the support device, preferably to the bearing member, orthogonally to the bearing member. Preferably, a carrier means is secured preferably orthogonally to the bearing member of the support device at an upper region, preferably upper edge/rear edge region, preferably at the upper end, of the bearing surface and another carrier means is secured preferably orthogonally to the bearing surface of the support device at a lower region, preferably the lower edge/front edge region, preferably the front end, of the bearing surface. The solar panel(s), for example, the edge of the solar panel(s) may be secured to the carrier means as described above.

Securing the solar panel(s) indirectly to the support device(s) using carrier means provides the advantage that the spacing of the single support devices within a mounting system for mounting a solar panel array is independent from the size of the solar panels and can, for example, be adjusted based on the conditions of the roof. Thus, the use of carrier means for securing solar panels to the support devices provides more flexibility and also reduces the amount of support devices needed for mounting a determined number of solar panels.

The panel mounting frame may further comprise a front strut member which projects upwardly from the base and preferably joins the bearing member at a front region of the support device. Desirably, the panel mounting frame is configured to support the solar panel pitched or oriented at an angle in the range of about 10° to about 40°, and more preferably of about 15° to about 30°, to the horizontal surface or flat rooftop. In this regard, the bearing member itself preferably slopes down from the upper end region of the rear strut member towards the front edge region of the base at an angle in the range of about 10° to 40° to the horizontal rooftop surface, and more preferably at an angle in the range of about 15° to about 30°.

Preferably, the front strut member and/or the rear strut member exhibit a declining width from the base upward towards the bearing member, e.g., the front strut member and/or the rear strut member are wider at the base than at a position close to the bearing member or at the bearing member.

In a preferred embodiment of the invention, the support device has an opening at an underside thereof which is sized and configured to receive and nest with an identical support device when one support device is stacked upon the other. In particular, the mounting frame of the support device that is upstanding from the base is adapted to receive and to nest with the mounting frame of an identical support device. Support devices of the invention are therefore preferably stackable in a nested configuration, which again facilitates compact transportation of multiple support devices for the assembly of a large solar panel array. In a preferred embodiment, the opening at an underside of the support device is an opening at an underside of a ballast-receiving recess, preferably an essentially centrally located ballast-receiving recess as described above. In one particular form of the invention, the mounting frame is open at laterally opposite sides thereof to provide an open framework structure. In an alternative form, however, the mounting frame may have closed laterally opposite sides and be configured as a hollow, upstanding structure, which is open through the base to permit stacking. Each strut member and/or wall of the mounting frame is desirably angled inwards in an upward direction from the base (i.e. inwardly tapering) to assist the nested stacking of the support devices. Thus, the strut members and/or wall of the mounting frame are preferably configured to allow nested stacking of the support device, in particular, of identical support devices.

In a preferred embodiment of the invention, each support device is manufactured from a polymer plastic material, such as a polyurethane, polyethylene (e.g. HDPE), or another suitable plastic material. Although the support device may also be formed from a metal, such as aluminium, cost factors favour plastic materials. The support device can be formed as an integral or unitary structure, for example, by a moulding process, such as injection moulding or compression moulding.

In a preferred embodiment of the invention, a width dimension of the base between its opposite side edges is less than half, and preferably less than one third, more preferably less than one quarter, and even more preferably less than one fifth of a length dimension of the base between the front and rear edge regions of the base. Preferably, a width dimension of the base between its opposite side edges is between one third (⅓) to one fifth (⅕), more preferably between one fourth (¼) to one fifth (⅕) of a length dimension of the base between the front and rear edge regions of the base. Thus, even with the base having ballast-receiving recesses at both sides of the mounting frame, the overall width of the base is still desirably less than one third of a length dimension of the base, and perhaps only about one quarter or one fifth of the length. For example, the length of the base may be in the range of about 1000 mm to about 1500 mm, and more preferably about 1000 mm to about 1200 mm, whereas the width of the base may be, for example, in the range of about 200 mm to about 500 mm, more preferably about 250 mm to about 500 mm, more preferably about 250 to 400 mm, and more preferably about 300 mm to about 400 mm.

Preferably, the dimensions of the base exceed the dimensions of a vertical projection of the mounting frame onto the base. This means, for example, that a width dimension (lateral dimension, i.e., the distance between two lateral edges) and/or a length dimension (longitudinal dimension, i.e., distance between front and rear edge), preferably the width dimension, of the vertical projection of the base onto a surface exceeds the width dimension and/or the length dimension, preferably the width dimension, of the vertical projection of the mounting frame, preferably the vertical projection of the bearing member, onto the base. In a preferred embodiment, the width dimension of the vertical projection of the mounting frame, preferably the vertical projection of the bearing member of the mounting frame, onto the base is 1:1.2 to 1:10, preferably 1:1.5 to 1:5, more preferably not more than 1:4, even more preferably not more than 1:2, even more preferably not more than 1:1.5 of the lateral dimension of the base, the mounting frame preferably being essentially centrally located within the base.

In a preferred embodiment, the support device is configured such that at least two support devices are necessary to securely mount one solar panel of regular size. By using two support devices each support device is suitable to support one edge of a conventional solar panel such that two support devices configured in a parallel arrangement may support two opposite edges of a conventional solar panel. In particular, a lateral dimension, e.g., a width dimension, of the bearing member of the mounting frame, preferably of the mounting frame, even more preferably of the base, is preferably substantially less than a lateral dimension, e.g., a width dimension, of a conventional solar panel. This means, for example, that the lateral dimension of the bearing member of the mounting frame, preferably of the mounting frame, even more preferably of the base, is 1:4 to 1:50, preferably, not more than 1:10, more preferably not more than 1:15, e.g., 1:5, 1:6, 1:7, 1:8, 1:9, 1:10, 1:15, 1:20, 1:30 etc., of the lateral dimension of a conventional solar panel. For example, a single support device is suitable for supporting one edge of a conventional solar panel. For example, the bearing member, preferably the mounting frame, preferably the base, may exhibit a width of up to about 500 mm, preferably of up to about 400 mm, more preferably of up to about 300 mm, even more preferably of up to 200 mm. For example, the bearing member may exhibit a width of about 10 to 500 mm, preferably, 20 to 300 mm, preferably, 30 to 150 mm, such as 30, 40, 50, 60, 70, 80, 90, 100, 110, 120, 130 or 140 mm, the mounting frame may exhibit a width of about 10 to 500 mm, preferably, 20 to 300 mm, preferably, 30 to 150 mm, such as 30, 40, 50, 60, 70, 80, 90, 100, 110, 120, 130 or 140 mm, and the base may exhibit a width of about 50 to 500 mm, preferably, 100 to 400 mm, preferably, 100 to 300 mm, such as 100, 200, 300, 400, 500 mm.

It is to be understood that the width of the bearing member does not necessarily have to be equal throughout its longitudinal extension. For example, a width dimension of the bearing member at the front edge region may exceed a width dimension of the bearing member at the upper/rear edge region or vice versa.

In a preferred embodiment, the longitudinal dimension (i.e., the distance between the front/lower edge and the rear/upper edge) of the mounting frame, in particular the bearing member of the mounting frame, is configured to support/accommodate the entire length of a conventional solar panel. Thus, preferably, the longitudinal dimension of the mounting frame, preferably, the bearing member of the mounting frame, equals at least the longitudinal dimension of a conventional solar panel, preferably, is essentially equal to the longitudinal dimension of a conventional solar panel.

The present invention provides in a one aspect a support device (2) for mounting a solar panel (P), comprising:
 a base (3) for seating on a substantially flat surface (R); and
 a panel mounting frame (9) upstanding from the base (3) and integral therewith, the mounting frame (9) configured to support a solar panel (P) such that the panel (P) slopes downwardly towards a front edge (6) of the base (3);
 wherein the base (3) includes at least one recess for receiving ballast (B) to stabilise the support device (2) on the surface (R), and wherein an edge region (6, 7) of the base (3) is configured to engage and secure a fastening strap (15) which extends from the edge region (6, 7) for attachment to the surface (R).

Preferably, the at least one ballast-receiving recess (5) is formed as a chamber or cavity, the chamber or cavity preferably being upwardly open for receiving the ballast from above; and/or
 preferably, the at least one ballast-receiving recess (5) is elongate and extends between front and rear edge regions (6, 7) of the base (3), preferably at a lateral side of the mounting frame (9); and/or
 preferably, the base (3) of the support device (2) includes two ballast-receiving recesses (5) which extend at laterally opposite sides of the mounting frame (9); and/or
 preferably, the base (3) of the support device (2) has a generally flat underside and/or footings for seating stably on the surface (R), and wherein the at least one ballast-receiving recess (5) has a tray-like configuration.

Preferably, the mounting frame (9) is configured to support the solar panel (P) pitched at an angle in the range of about 10° to about 40°, preferably in the range of about 15° to about 30°, to the horizontal surface or flat rooftop. Preferably, the mounting frame (9) comprises a rear strut member (10) that projects upwardly from the base (3), and a bearing member (12) provided at an upper end region of the rear strut member (10) and configured to bear the solar panel; the bearing member (12) preferably extending from an upper end region of the rear strut member (10) towards a front edge region (6) of the base (3), and preferably at an angle in the range of about 10° to about 40° to the surface, and the mounting frame (9) preferably further comprising a front strut member (ii) which projects upwardly from the base (3) and joins the bearing member.

Preferably, the support device further comprises an opening (8) in the base (3) configured to receive the mounting frame (9) of an identical support device (2), such that one support device nests with the other in a stacked arrangement.

In a preferred embodiment of the support device of the present invention, a width dimension (W) of the base (3) between its opposite side edge regions (21) is less than half, and preferably less than one third, of a length dimension (L) of the base (3) between its front and rear edge regions (6, 7).

In another aspect, the present invention provides a mounting system for one or more solar panels comprising at least one, preferably at least two, support devices as described above. Preferably, the mounting system comprises a plurality of the support devices adapted to be arranged spaced apart and substantially parallel to one another for receiving and supporting a solar panel extending between them. In other words, the support devices can be arranged side-by-side, laterally spaced apart in one or more rows, with a solar panel (e.g. a framed solar panel module) adapted to be positioned between each adjacent pair of support devices in each row, for example, by placing opposite edges of the solar panel on an upper surface of the bearing members.

Alternatively, rather than the solar panels being placed on an upper surface of the bearing members, the mounting system may include one or more mounting rails. Preferably, the one or more mounting rails extend from the one or more support devices, preferably, from the mounting frame, such as from the bearing member, of the one or more support devices.

Such mounting rails may extend transversely between the frames of adjacent support devices upon which the solar panels are fixed. That is, the mounting rails may extend substantially horizontally between support devices, preferably in pairs spaced apart from one another at different heights (i.e. an upper rail and a lower rail) to support each solar panel such that it is angled downwards towards a front edge region of the base. Alternatively, said mounting rails may extend from one support device but may not reach a support device positioned neighbouring support device. For example, the mounting rails may stretch across half or one third or one fourth of the distance between two neighbouring support devices of the mounting system.

Because the solar panel modules in these embodiments are affixed to the rails rather than directly to the support devices, the spacing between adjacent support devices need no longer correlate to the width of the solar panels. In this embodiment, therefore, the support devices in each row may be spaced apart from one another differently than was possible in the previous embodiment, where an edge of each solar panel rested on the upper surface of each bearing member. That is, the spacing between the support devices in each row is not dictated by the width of the solar panels; as such, that they may optionally be spaced further apart.

In a preferred embodiment, the mounting system further comprises mounting rails which are configured to extend from the mounting frame, preferably from the bearing member, of the support device. Preferably, the mounting system further comprises mounting rails which are configured to extend transversely between the frames of adjacent support devices upon which the solar panels may be fixed as described above.

In a preferred embodiment the mounting system further comprises a flexible fastening member as described above. Preferably, the flexible fastening member is configured to extend through the base as described above.

In a preferred embodiment, the support devices comprised by the mounting system are not interconnected at the base when mounted on a surface, such as a rooftop.

In another aspect, the present invention provides a mounting system for one or more solar panels, including: at least one support device for receiving and supporting a solar panel thereon, and at least one flexible fastening member for securing the support device to a substantially flat or horizontal (e.g. rooftop) surface. The support device comprises: a base adapted to seat stably on the substantially horizontal surface, the base having at least one recess for receiving ballast to stabilise the support device on the surface; and a mounting frame upstanding from the base, and preferably integral therewith, the mounting frame configured to support the solar panel such that it slopes downwardly towards a front edge region of the base. Preferably, the support device is configured as described above. The flexible fastening member engages the support device and extends there-from, and has an attachment portion which is secured to the substantially horizontal surface.

As noted above, the attachment portion of the flexible fastening member or fastening strap is preferably adapted to be secured to a waterproof sealing layer or membrane of the substantially horizontal (e.g. rooftop) surface without penetrating that layer or membrane. For example, the fastening member/strap may be secure to the surface by adhesive bonding or by fusion or welding (e.g. hot or cold welding). In a typical embodiment, the mounting system includes a plurality of flexible fastening members or straps extending from and securing each support device.

In a preferred form of the invention, the mounting system comprises a plurality of the support devices adapted to be arranged spaced apart and substantially parallel to one another for receiving and supporting a solar panel extending between them. In other words, the support devices can be arranged side-by-side, laterally spaced apart in one or more rows, with a solar panel (e.g. a framed solar panel module) adapted to be positioned between each adjacent pair of support devices in each row.

In a preferred form of the invention, a plurality of the flexible fastening members (or straps) secure edge regions of the base of the support device to the horizontal surface or rooftop. Thus, the edge regions of the base may be configured to engage with a respective one of the flexible fastening members/straps. In this regard, the edge regions of the base of each support device preferably include a peripheral flange for fixing a respective fastening member/strap, e.g. by means of fixation elements, such as rivets, screws, or by an adhesive connection. Although it is preferred to attach the fastening straps at the front and rear edge regions of the base of each support device, the fastening straps may alternatively and/or additionally engage and extend from lateral side regions of the base. Alternatively, or in addition, the straps may extend over and/or through the base, e.g. through one or more apertures provided in the base, to engage and hold the support device in this fashion as described above.

As also noted above, the mounting frame may have a rear strut member that projects upwardly from the base, and at least one bearing member configured to bear the solar panel, which is angled downwardly from an upper end region of the rear strut member towards the front edge region of the base. Rather than the solar panels being placed on an upper surface of the bearing members, however, in an alternative embodiment the mounting system may include mounting rails which extend transversely between the frames of adjacent support devices upon which the solar panels are fixed. That is, the mounting rails may extend substantially horizontally between support devices, preferably in pairs spaced apart from one another at different heights (i.e. an upper rail and a lower rail) to support each solar panel such that it is angled downwards towards a front edge region of the base. Because the solar panel modules in this embodiment are affixed to the rails rather than directly to the support devices, the spacing between adjacent support devices need no longer correlate to the width of the solar panels. In this embodiment, therefore, the support devices in each row may be spaced apart from one another differently than was possible in the previous embodiment, where an edge of each solar panel rested on the upper surface of each bearing member. That is, the spacing between the support devices in each row is not dictated by the width of the solar panels; as such, that they may optionally be spaced further apart.

In a preferred form of the invention, the at least one ballast-receiving recess can be formed as a chamber or cavity, which is preferably open at an upper side thereof for filling with ballast from above. The ballast-receiving recess preferably has an elongate form and extends between front and rear edge regions of the base of the support device. In this regard, the ballast-receiving recess is desirably arranged at either or both of the laterally opposite sides of the mounting frame. In a preferred embodiment, the base has a ballast-receiving recesses arranged at both of the laterally opposite sides of the mounting frame, which itself is preferably arranged substantially centrally of the base. Each ballast-receiving recess is desirably in the form of a shallow rectangular tray or trough, which may be filled, for example, with gravel or stones (e.g. paving stones) to stabilise the support device on the rooftop surface. In an alternative configuration, each ballast-receiving recess may comprise a chamber or cavity that is formed as a tank, e.g. a substantially enclosed tank, for receiving and holding a liquid, such as water, or other "pourable" ballast, such as sand or gravel.

In a particularly preferred embodiment, the ballast-receiving recess is located essentially centrally within the base, preferably, within an area of a vertical projection of the mounting frame onto the base, e.g., beneath the bearing member of the mounting frame, as described above.

In a preferred embodiment, the mounting system further includes a plate- or panel-like cover member for covering an opening at a rear side below an elevated or upper edge of a solar panel between adjacent support devices. In particular, the mounting system may include a plurality of such cover members, which together extend along the row of the support devices covering the otherwise open rear side of the solar panel assembly. In this way, the cover members serve to guide wind incident from the rear side of the assembly upwardly and over the solar panels mounted on the support devices. The cover members may comprise a sheet material, such as metal or plastic, which may be formed by rolling, extrusion or moulding.

In a preferred form, the mounting system of the invention also includes ballast to be placed in the ballast-receiving recesses of the multiple support devices for stabilising each of the support devices in position on the rooftop surface. The ballast may be in the form of a bulk commodity, such as gravel or sand or water, which can be poured into the respective recess, cavity or chamber. Alternatively, the ballast may comprise a number of larger and heavier individual items, such as paving stones, which can be separately placed into a respective one of the ballast-receiving recesses.

In a further aspect, the present invention provides a solar panel assembly comprising a solar panel mounting system according to the invention as described above, and one or more solar panels to be mounted on the mounting system.

In yet another aspect, the present invention provides a method of mounting one or more solar panels on a rooftop surface, the method comprising the steps of:
 arranging a plurality of the support devices of the invention described above spaced apart side-by-side and substantially parallel to one another in one or more rows on a rooftop surface;
 providing ballast for the ballast-receiving recesses of the support devices; providing a plurality of fastening straps as described above for securing the support devices to the rooftop surface, wherein each of the fastening straps has an attachment portion to be secured to the rooftop surface, and
 arranging the fastening straps such that the attachment portions thereof extend from respective edge regions of the base of each of the support devices; and
 securing the attachment portions of the fastening straps to the rooftop surface, preferably without penetrating an outer sealing layer of the rooftop surface.

In a preferred form of the invention, the method comprises the step of positioning a solar panel such that it is supported upon and extends between the mounting frames of two adjacent support devices, and rigidly connecting the solar panel to each of the respective mounting frames.

The present invention provides in one aspect a mounting system (1) for one or more solar panels (P), comprising:
 at least one support device (2) for mounting a solar panel (P) thereon, the support device (2) comprising:
 a base (3) adapted to seat stably on a substantially flat rooftop surface (R), the base (3) having at least one recess (5) for receiving ballast (B) to stabilise the support device (2) on the surface (R); and
 a mounting frame (9) upstanding from the base (3) and integral therewith, the mounting frame (9) being configured to support the solar panel (P) such that said panel (P) slopes downwardly towards a front edge region (6) of the base (3); and
 at least one flexible fastening member (15) adapted to engage and to extend from the support device (2), wherein the fastening member (15) has an attachment portion (17) adapted to be secured to the rooftop surface.

Preferably, the attachment portion (17) of the fastening member (15) is adapted to be secured to the rooftop surface (R), in particular to a waterproof layer or membrane of the rooftop surface (R), without penetrating same, e.g. by fusion bonding or adhesion.

Preferably, the at least one flexible fastening member (15) engages, and is preferably affixed to, the base (3) of the support device (2), e.g. at an edge region (6, 7) thereof, and/or the flexible fastening member (15) extends across the base (3) of the support device (2).

Preferably, the at least one flexible fastening member (15) is formed at least partially, and preferably substantially entirely, from a flexible web of material for adhesive or fusion bonding with the rooftop surface (R), and wherein the fastening member (15) is arranged to extend from the edge region (6, 7) of the base (3) such that the attachment portion (17) is arranged outside a plan or vertical projection of the base (3) onto the rooftop surface (R).

In a preferred embodiment of the mounting system (1) according to the present invention, the at least one ballast-receiving recess (5) is formed as a chamber or cavity, the chamber or cavity preferably being upwardly open for receiving the ballast (B) from above; and/or
 preferably, the at least one ballast-receiving recess (5) is elongate and extends between front and rear edge regions (6, 7) of the base of the support device (2), preferably at a lateral side of the mounting frame (9); and/or
 preferably, the base (3) of the support device (2) includes two ballast-receiving recesses (5) which extend at laterally opposite sides of the mounting frame (9); and/or
 preferably, the base (3) of the support device (2) has a generally flat underside and/or footings for seating stably on the rooftop surface (R), and preferably the at least one ballast-receiving recess (5) has a low profile such that it has a tray- or trough-like configuration.

In a preferred embodiment, the mounting frame (9) of the support device (2) includes a rear strut member or wall member (10) that projects upwardly from the base (3), and a bearing member (12) configured to bear the solar panel (P), which slopes downwardly from an upper end region of the rear strut or wall member (10) towards the front edge region (6) of the base (3).

Preferably, the panel mounting frame (9) of each support device (2) further includes a front strut member or front wall member (ii) which projects upwardly from the base (3) and joins the bearing member (12).

In a preferred embodiment of the mounting system (1) according to the present invention, the support device (2) has an opening (8) at an underside of the base which is configured to receive an identical support device (2) and to nest therewith when the one support device is stacked upon the other.

Preferably, the mounting system includes:
 a plurality of the support devices (2) configured to be arranged spaced apart and substantially parallel to one another for receiving and supporting a solar panel (P) which extends there-between; and/or a plurality of the flexible fastening members (15) adapted to engage and to extend from the at least one support device (2).

The support device and the mounting system of the invention have been conceived to provide two modes of stabilisation, each of which counteracts forces acting in a specific direction. Once assembled on a rooftop, solar panel arrays are exposed to considerable forces resulting from wind loading. Some of these forces act vertically upwards and generate lift forces analogous to those that act on an aeroplane wing, principally resulting from the angled profile of the panels. The ballast combines with the weight of the panels to counteract these vertically directed forces and to stabilise the array against being lifted from the rooftop. The wind also generates horizontal forces, however, which tend to push the solar panel arrays across the rooftop surface and the fastening straps are designed to counteract these forces and to stabilise the array horizontally. In this regard, the straps replace a substantial amount of ballast that would have otherwise been required for the same degree of horizontal stability.

Compared with the conventional solar panel mounting systems described at the outset, the support device and the mounting system of the invention provide various advantages. For example, the support device of the invention is stabilised and held in place utilising ballast or weights only to a limited extent so that excessive loading of the roof structure is avoided. By augmenting the stabilisation of the ballast using fastening straps, the new mounting system avoids any puncture or penetration of the outer sealing layer or membrane covering the rooftop (e.g. with bolt- or screw-type fasteners). In addition, the mounting system of the invention enables subsequent removal of the solar panel array and the bearing members without any damage to an outer sealing layer or membrane on the rooftop. That is, the straps may be cut or severed to leave just the bonded attachment portion thereof attached to the rooftop, while the solar panels and the support devices of the mounting system and can be disassembled and removed from the rooftop. The outer sealing layer or membrane that covers the rooftop thus remains entirely intact and unaffected.

Furthermore, particularly preferred embodiments of the support device according to the present invention, e.g., a support device, wherein a ballast-receiving recess is located essentially centrally within the base, preferably within the vertical projection of the mounting frame, wherein the recess comprises an opening at an underside, provide the advantages of space-saving support devices with associated convenient handling and low manufacturing and material costs and the possibility for nestable stacking for convenient and low-cost storage and transportation.

It will be appreciated that the terms "upper", "lower", "upwardly", "downwardly", "lateral", "laterally" as well as other similar terms used herein in respect of various parts of the mounting system and support device of the invention are intended to be given their ordinary meaning in view of the normal or in-use orientation of the mounting system described herein. It will also be appreciated, however, that other interpretations of these terms may be appropriate depending on the particular orientation of the system and/or its respective parts at the time.

Furthermore, it will be appreciated that the reference to a "substantially horizontal" surface in connection with the mounting system and support device of the invention is understood to include surfaces having a slight grade or slope from a few degrees up to about 10°, as is typical with flat rooftops to promote run-off and drainage.

Furthermore, it will be appreciated that the terms "front edge region", "rear edge region", and "lateral side edge region" preferably refer to the front edge, the rear edge, and the "lateral side edge", respectively.

BRIEF DESCRIPTION OF THE DRAWINGS

The above and further features and advantages of the invention will become more readily apparent from the following detailed description of preferred embodiments of the invention with reference to the accompanying drawings, in which like reference characters identify like features, and in which.

DETAILED DESCRIPTION OF THE PREFERRED EMBODIMENTS

Figure 1:
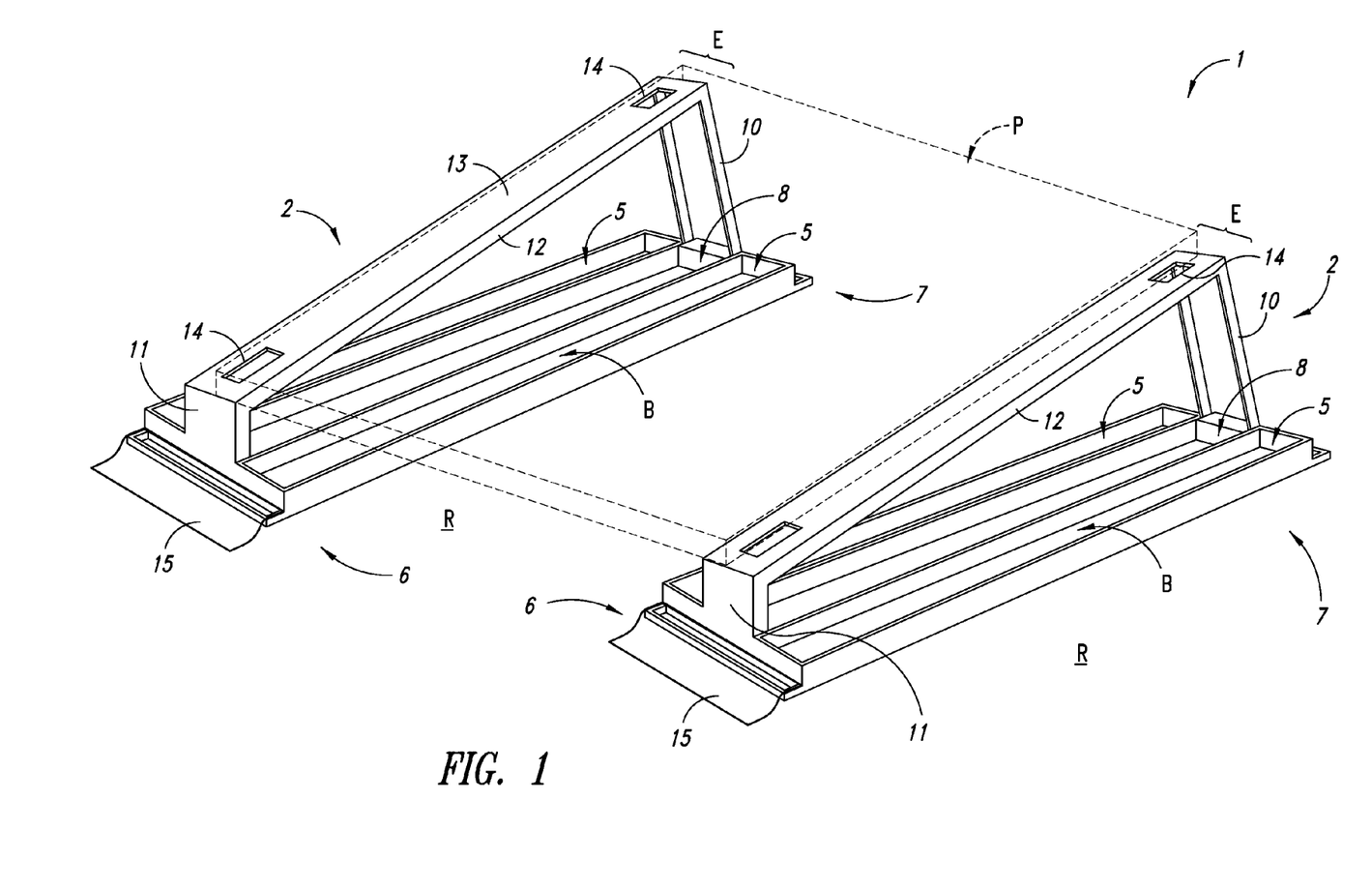
FIG. 1 is a schematic perspective view of a solar panel assembly based on a system for mounting a solar panel on a rooftop according to a preferred embodiment of the present invention.

With reference to FIG. 1 of the drawings, a solar panel assembly based on a system 1 for mounting one or more solar panels on a substantially horizontal or flat rooftop surface R is illustrated schematically. Two support devices 2 are shown arranged side-by-side and spaced apart substantially parallel to one another for supporting a solar panel P extending therebetween. Each of the support devices 2 is substantially identical and is shown in isolation in the drawings FIGS. 2 to 4.

Figure 2:
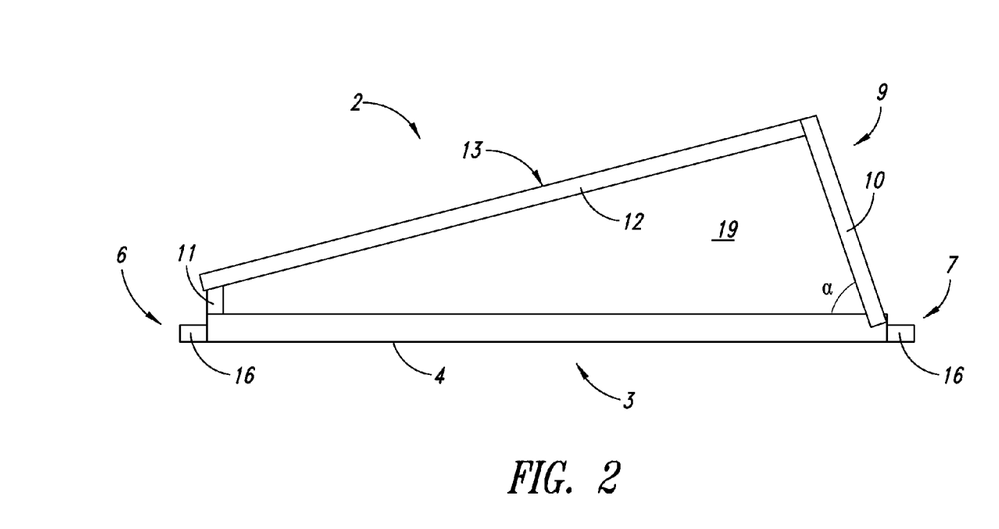
FIG. 2 is a side view of a support device according to a preferred embodiment of the invention from the mounting system of FIG. 1.
Figure 3:
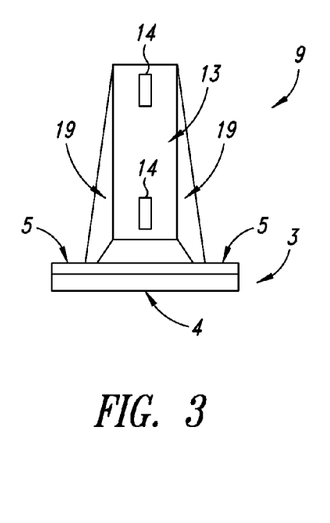
FIG. 3 is a front view of the support device shown in FIG. 2.
Figure 4:
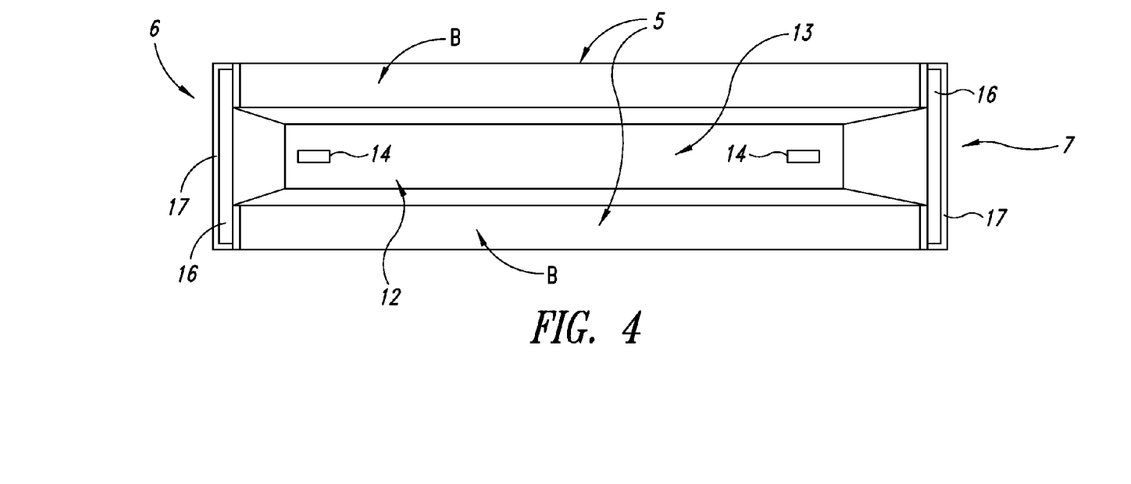
FIG. 4 is a top view of the support device shown in FIG. 2.

Focussing firstly on the design of the support device 2 of the invention, each support device 2 according to this embodiment comprises a base 3 having a substantially flat underside 4 for seating stably on the substantially horizontal or flat rooftop surface R. The base 3 has a relatively low profile, with short upstanding sides forming two long, upwardly open tray- or trough-like recesses 5 which extend between a front edge region 6 and a rear edge region 7 of the support device 2 at laterally opposite sides of a central opening 8 (to be described in more detail later). The tray- or trough-like recesses 5 form cavities or chambers for receiving and holding ballast material B, like gravel, sand or paving stones, the weight of which helps to stabilise the support device 2 in its position on the rooftop surface R. By limiting the size of the ballast-receiving recesses 5 in the base 3 of the support device, the amount of ballast, and therefore also the degree of additional loading to the roof structure can be limited. In this embodiment, the base 3 has a length of about 1200 mm and a width of about 300 mm, with each ballast-receiving recess 5 having a width of about 100 mm and the short upstanding sides thereof having a height of about 50 mm.

Each support device 2 further includes a mounting frame 9 located centrally of the base 3 between the two ballast-receiving recesses 5. The mounting frame 9 is formed integrally with and upstanding from the base 3, and is designed to support the solar panel P such that it slopes downwardly towards the front edge region 6 of the base. The mounting frame 9 includes a rear strut member 10 and front strut member 11, both of which project upwardly from the base 3, and a bearing member 12 which slopes downwardly at an angle of about 20° to 30° to the horizontal from an upper end region of the rear strut member 10 to join an upper end region of the front strut member 11. The bearing member 12 presents a substantially flat upper bearing surface 13 which, in this embodiment, is configured to receive and bear a peripheral edge region E of the solar panel module P supported by the mounting frame 9. In this regard, the bearing member 12 is provided with rectangular holes or openings 14 for receiving a fixation device (not shown) such as a clamp or bolt arrangement for securing the edge region of the solar panel to the mounting frame. In this embodiment, the front and rear strut members 10 and the bearing member 12 have lateral flange elements which provide a continuous "C"- or "U"-shaped profile or cross-section (i.e. depending on orientation or viewing direction), which thereby enhances the longitudinal bending strength of each member.

The front and rear edge regions 6, 7 of the base 3 of each of the support devices 2 includes means for engaging and securing a flexible fastening member 15, such as a fastening strap. In this particular embodiment, the engagement and securing means include a flange member 16 at each of the front and rear edge regions 6, 7 of the base 3.

Each flange member 16 may optionally include a raised lip or rim 17 and/or a bar or loop. In this embodiment, the mounting system 1 includes a plurality of the flexible fastening members or straps 15, at least one of which is secured to and extends from a respective one of the flange members 16 at the front and rear edge regions 6, 7 of the base 3 of each support device 2. In this regard, a respective one of the fastening straps 15 is secured to each flange member 16 by rivets or screws (not shown), and each fastening strap 15 includes an attachment portion 18 that extends from the respective edge region 6, 7 beyond a plan or vertical projection of the base 3 onto the rooftop surface. In other words, the fastening straps 15 extend forwardly and rearwardly from the front and rear edge regions 6, 7 of the base, where they are bonded to an outermost membrane or sealing layer on the rooftop surface R, e.g. by hot or cold fusion or by adhesive bonding, such that the waterproof properties of the membrane or sealing layer are not compromised.

As is apparent from FIGS. 1 and 2 of the drawings, lateral sides 19 of the mounting frames 9 of each of the support devices 2 are open to provide a generally open framework structure. While it is also conceivable to form the mounting frame 9 as an enclosed structure, i.e. with lateral or side wall members at the open lateral sides 19 such that the rear and front struts 10, 11 would perhaps be better described as rear and front "wall" members, the open structure of the present embodiment avoids unnecessary material and thus minimises costs for manufacture and transport of the support devices 2.

The rectangular opening 8 noted earlier through the base 3 of each support device 2 is directly below the mounting frame 9. The purpose and design of this opening 8 is to facilitate stacking. That is, the support devices 2 are designed to be stacked upon one another in such a way that the mounting frame 9 of a first support device 2 is received through the opening 8 in the base 3 of an identical support device 2 placed on top of it. In this way, the mounting fame 9 of the lower support device 2 nests essentially entirely under mounting frame 9 of the support device 2 located above it. By orienting the rear strut 10 and the front strut 11 at an angle of less than 90° with respect to the base, the mounting frame 9 has an upwardly tapering form which can promote the nesting of the respective support devices 2.

Furthermore, the angle a of the rear strut 10 relative to the base 3 is preferably selected to be in the range of about 40° to about 80°, and more preferably about 60° to about 70°, for providing a desirable airflow over the solar panel P mounted on the respective support devices. In this regard, the mounting system 1 desirably further includes cover members 25 (shown in FIG. 10) in the form of panels or sheeting arranged to extend between the rear struts 10 of the support devices 2 to cover the opening or space below the elevated rear edge of each solar panel P. In this way, the open rear side of the solar panel assembly can be closed so that wind incident on the assembly from the rear is directed upwards by the cover members and guided over an upper surface of the solar panels P.

Figure 5:
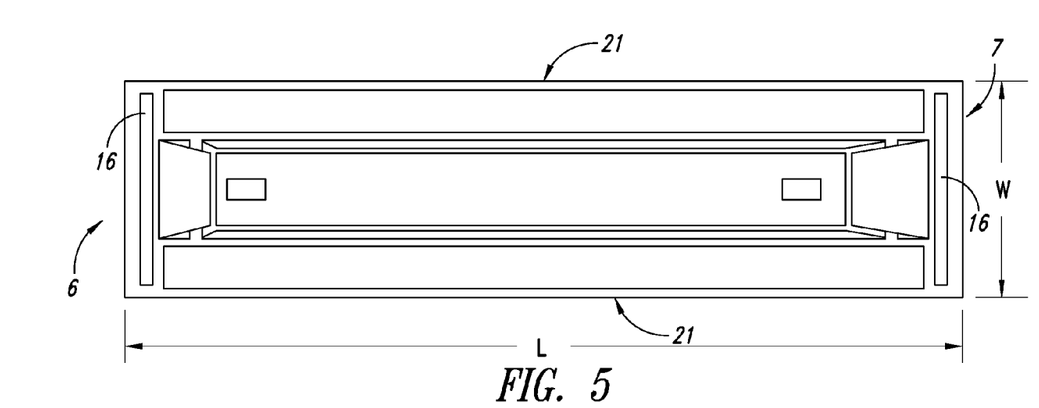
FIG. 5 is a top view of a support device according to a preferred embodiment of the invention, essentially corresponding to FIG. 4.
Figure 6:
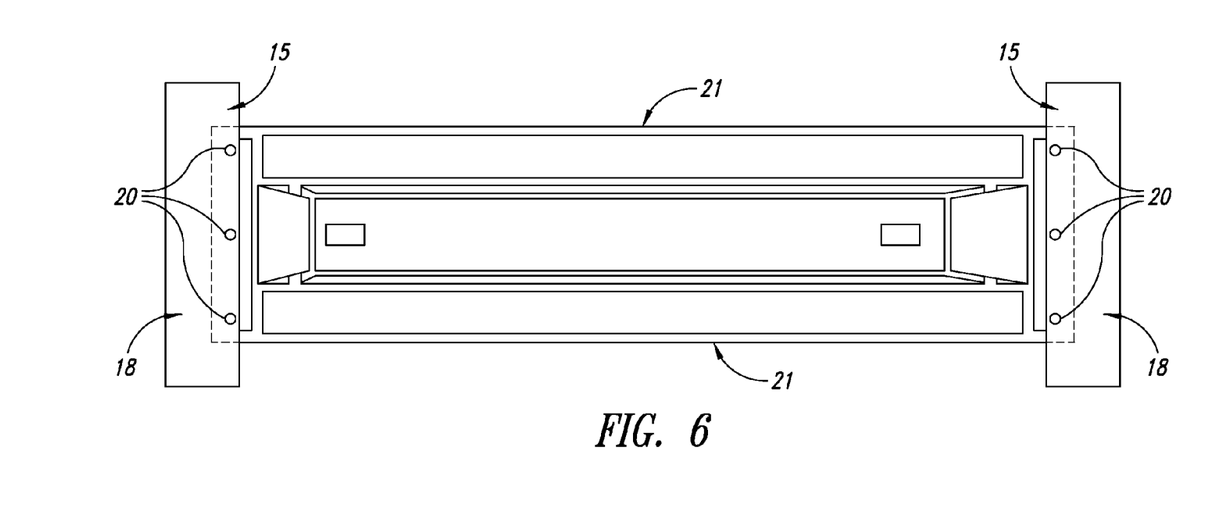
FIG. 6 is a top view of the support device shown in FIG. 5, but also illustrating flexible fastening members or straps at the front and rear edge regions of the base.

With reference to FIGS. 5 and 6 of the drawings, the support device 2 of the invention is shown in plane view. In one case (i.e. FIG. 5) the view essentially corresponds with FIG. 4. In the other case (i.e. FIG. 6), however, the view shows two flexible fastening members 15 in the form of rectangular web material which is secured to the front and rear flange members 16 via rivets 20. An attachment portion 18 of each of the fastening members 15 extends from the respective front and rear edge region 6, 7 of the base 3 beyond the plan or vertical projection of the base 3. In these views, also, it is apparent that a width dimension W of the base 3 between its opposite side edge regions 21 is less than one third, and preferably only about one quarter, of a length dimension L of the base 3 between its front and rear edge regions 6, 7. The bearing member 12 in this embodiment has a width of about 100 mm and its lateral flange elements have a height of about 20 mm. Further, the rectangular openings or holes 14 for fixing the solar panel P on the bearing member 12 in this embodiment have a length of about 200 mm and a width of about 15 mm, preferably between 20 mm and 70 mm. In this embodiment the support device 2 is moulded from a plastic material and has a generally uniform wall thickness of about 4 mm.

Figure 7:
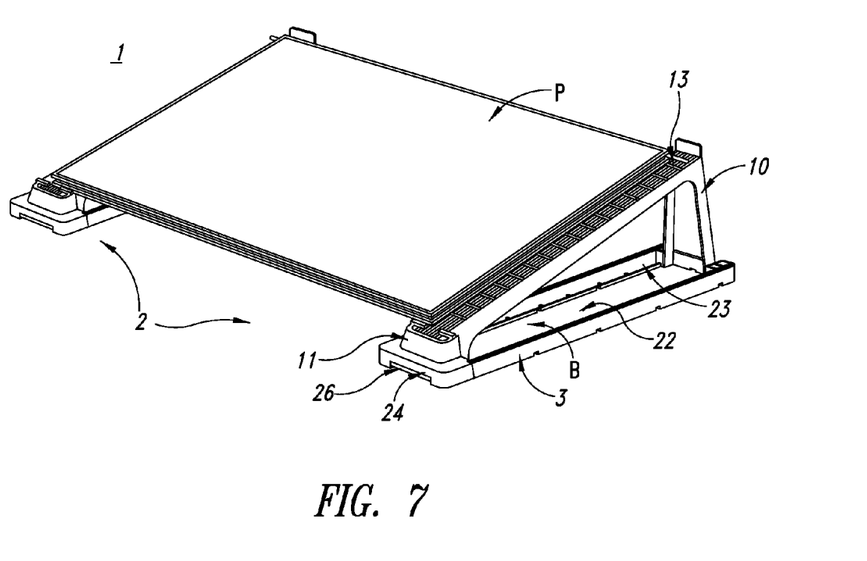
FIG. 7 is a schematic perspective view of a solar panel assembly based on a system for mounting a solar panel on a rooftop according to a preferred embodiment of the present invention, wherein the ballast-receiving recess is located centrally within the base and comprises an opening at an underside.

With reference to FIG. 7 of the drawings, a preferred solar panel assembly based on a system 1 for mounting one or more solar panels on a substantially horizontal or flat rooftop surface R is illustrated schematically. This system is based on support devices with a centrally located ballast-receiving recess. Two support devices 2 are shown arranged side-by-side and spaced apart substantially parallel to one another for supporting a solar panel P extending there-between. Each of the support devices 2 is substantially identical and is shown in isolation in the drawing FIG. 9. The schematic representation in FIG. 7 also includes a means for allowing a flexible fastening member to extend through the base 24, i.e., an aperture which results in a bar-like structure 26 that is formed within the front edge of the base. Thus, the support device shown in FIG. 7 is configured to allow a flexible fastening member to extend through the base, in particular, to be threaded, slid, or slipped through the base (cf. also FIGS. 9 and 10).

Figure 8:
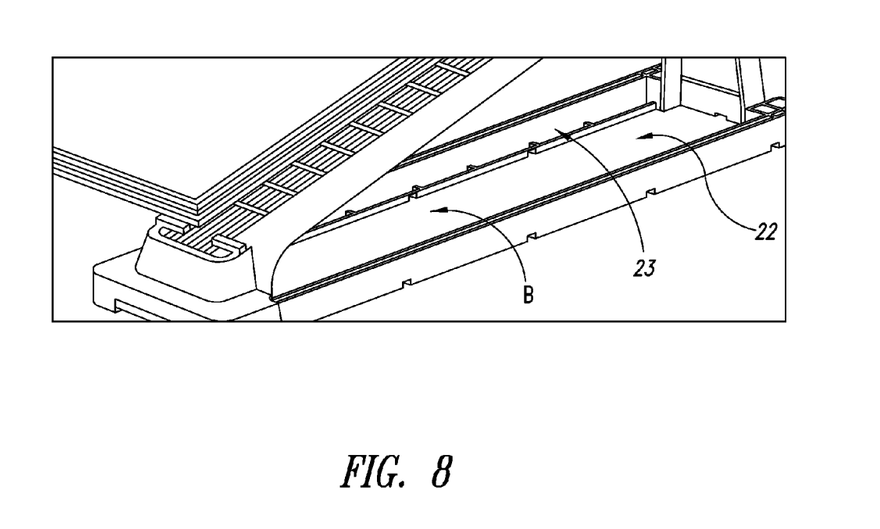
FIG. 8 is a magnification of the base portion of the support device shown in FIG. 7.

FIG. 8 is a magnified view of the base region of the support device 2 shown in FIG. 7. Ballast B, for example, a paving stone preferably in plate-, cube- or cuboid-like shape, is preferably placed on the ballast-bearing surface 23 of the ballast-receiving recess, wherein the ballast bearing surface 23 preferably extends along both lateral sides of the ballast-receiving recess. Preferably, the dimensions of the ballast B, such as the paving plate, are such that the ballast B extends between and preferably rests on both lateral sides of the ballast-bearing surface 23. Thus, in a preferred embodiment, the ballast used is slightly wider than the width (extension form on lateral side to the other) of the opening 22 at an underside of the recess.

In one embodiment (not shown), the opening 22 at an underside of the ballast-receiving recess is covered by a covering means, such as a plate or tray before ballast B is placed into the ballast receiving recess. Preferably, the dimensions of the covering means, such as the plate or tray, are such that the covering means extends between and preferably rests on both lateral sides of the ballast bearing surface 23. This setup provides the advantage that the weight of the ballast can be evenly distributed over the surface, for example, the roof top, on which the support device is mounted. In this embodiment, the ballast may be any shape or size, for example, the ballast may be gravel, sand, or stones (e.g. paving stones) etc. or even tanks filled with liquids or the like.

Figure 9:
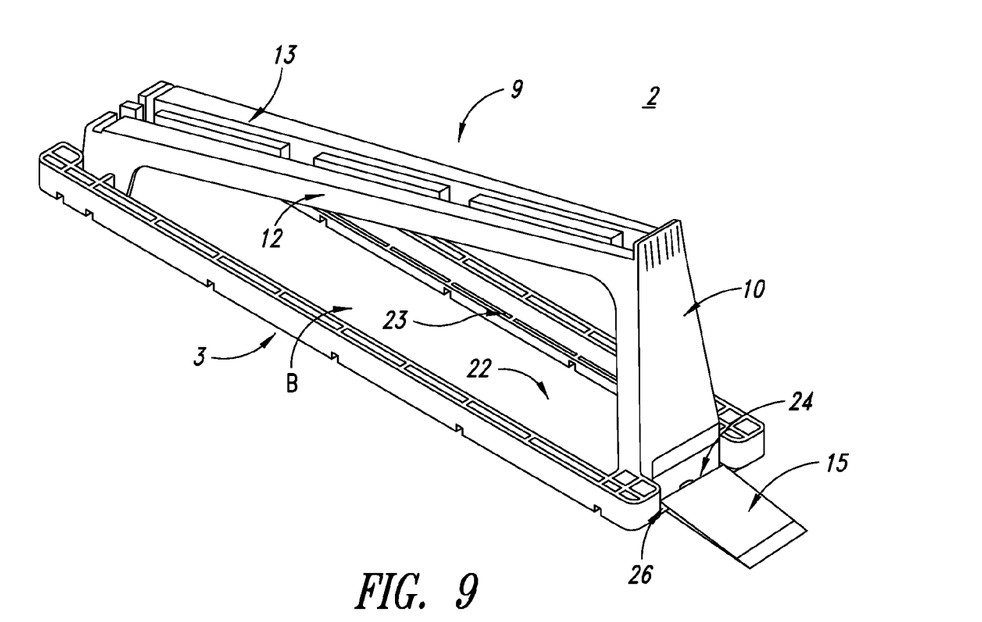
FIG. 9 shows a preferred embodiment of a support device, wherein a flexible fastening member is a fastening strap extending through the base.

FIG. 9 illustrates a particularly preferred embodiment of the support device 2, wherein the ballast-receiving recess (i) is located centrally underneath the mounting frame 9 and (ii) comprises an opening 22 at an underside. Furthermore, the ground-facing side of the ballast-receiving recess comprises a ballast-bearing surface 23 and the base 3 of the support device 2 comprises an aperture 24 located at the rear edge region which provides a bar-like structure 26 which is part of the base 3 allowing a flexible fastening member or strap 15, to be threaded, slipped or slid through the base 3. Thus, the aperture 24 may be considered a means for allowing a flexible fastening member to extend through the base, e.g., to be threaded, slid, or slipped through the base. The fastening strap 15 in FIG. 9 is bent around the bar-like structure 26 and folds back on itself. For fixing such support device to a rooftop, both ends of the fastening strap are preferably connected to a membrane covering the rooftop without penetrating same; for example, by adhesive bonding or by fusion or welding (e.g. hot or cold welding). Preferably, the flexible fastening member 15 is made of the material of the membrane covering the roof top.

Figure 10:
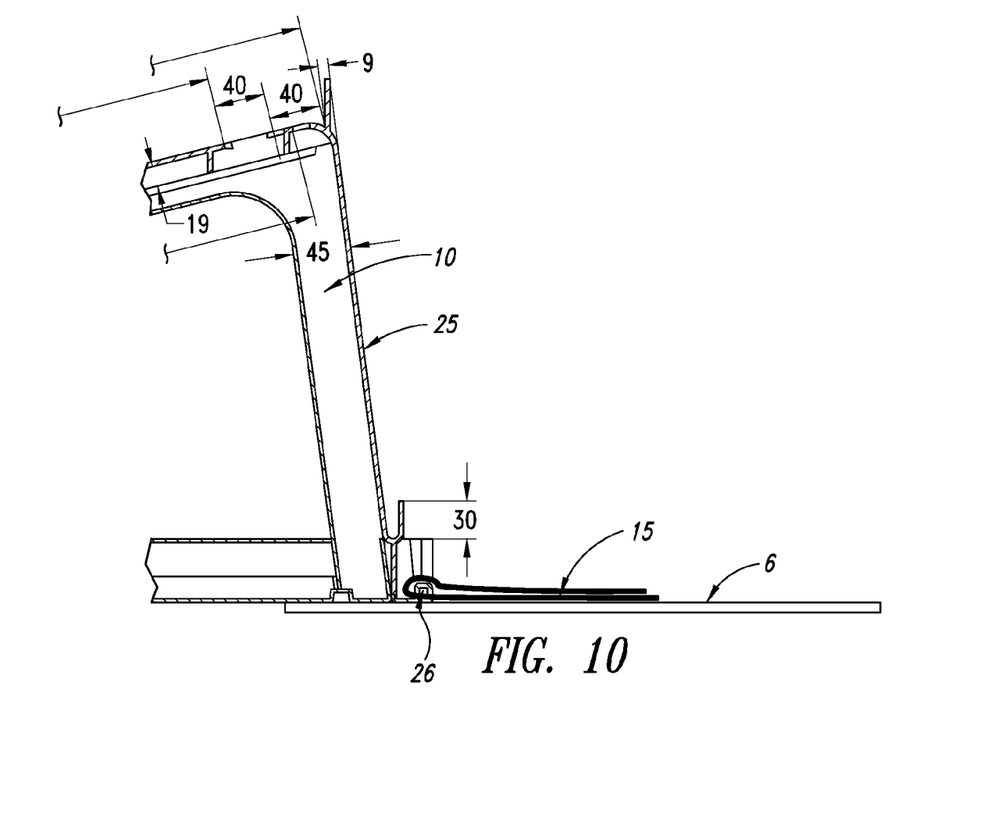
FIG. 10 is a schematic side view of a rear edge region of the support device 2, wherein a flexible fastening strap 15 bends around a bar-like structure of the base and folds back on itself.

FIG. 10 illustrates a side view of a rear edge region of the support device 2, wherein a fastening strap 15 extends though the base by bending around bar-like structure 26 within the base that is formed by an aperture within the base. The fastening strap 15 is folded back on itself and both ends extend away from the rear edge region of base 3 such that an attachment portion of that fastening member is arranged outside a plan or vertical projection of the base onto the rooftop surface 6. FIG. 10 also shows cover member 25 in the form of a panel or sheeting arranged to extend between the rear struts 10 of the support devices 2 to cover the opening or space below the elevated rear edge of each solar panel P.

It will be appreciated that the above description of the preferred embodiments of the invention with reference to the drawings has been made by way of example only. Accordingly, a person skilled in the art will appreciate that various changes, modifications and/or additions may be made to the parts particularly described and illustrated without departing from the scope of the invention as defined in the appended claims.

The invention claimed is:

1. A support device for supporting a solar panel, comprising:
    a base adapted to rest on a surface, wherein the base comprises a front edge region and a rear edge region; and
    a panel mounting frame coupled to the base, the panel mounting frame comprising a bearing member which is configured to support a solar panel thereon such that the solar panel slopes downwardly towards the front edge region of the base;
    wherein the base includes at least one recess for receiving a ballast to stabilize the support device on the surface, and wherein at least one of the front and rear edge regions of the base is configured to engage a flexible fastening member for attachment to the surface;
    wherein the base comprises an opening of a generally elongate form which extends between the front and rear regions of the base;
    wherein the opening is located within an area of a vertical projection of the mounting frame onto the base;
    wherein the dimensions of the opening are at least the dimensions of a vertical projection of the bearing member onto the base; and
    wherein the at least one recess for receiving the ballast comprises an opening at an underside of the recess.

2. A support device according to claim 1 wherein the panel mounting frame supports the solar panel pitched at an angle in the range of about 10° to about 40° to a horizontal surface or a flat rooftop.

3. A support device according to claim 1 wherein the panel mounting frame comprises a rear strut member that projects upwardly from the base, and a bearing member provided at an upper end region of the rear strut member and configured to bear the solar panel; the bearing member extending from an upper end region of the rear strut member towards a front edge region of the base, and being oriented at an angle in the range of about 10° to about 40° to the surface, the panel mounting frame further comprising a front strut member which projects upwardly from the base and is coupled to the bearing member.

4. A support device according to claim 1 wherein a width dimension of the base between its opposing side edge regions is less than half of a length dimension of the base between its front and rear edge regions.

5. A support device according to claim 1 wherein the recess is configured to receive ballast for stabilizing the support device on the surface and
    the recess is configured such that the support device comprising such recess is able to receive and nest with an identical support device when one support device is stacked upon the other.

6. A support device according to claim 1 wherein dimensions of the opening at an underside of the recess are at least the dimensions of the vertical projection of the panel mounting frame and the opening is located within the vertical projection of the panel mounting frame onto the base, and
    the recess comprises a ballast-bearing surface.

7. A support device according to claim 1 wherein an edge region of the base is configured to allow a flexible fastening member to extend through the base, and is adapted to be one of threaded, slid, and slipped though the base.

8. A mounting system for one or more solar panels comprising at least one support device according to claim 1.

9. A mounting system according to claim 8, further comprising a flexible fastening member configured to extend through the base.

10. A mounting system according to claim 8, further comprising at least one mounting rail configured to extend from the panel mounting frame of the at least one support device, and configured to extend transversely between the mounting frames of adjacent support devices.

11. A support device for supporting a solar panel, comprising:
- a base adapted to rest on a surface, wherein the base comprises a front edge region and a rear edge region; and
- a panel mounting frame coupled to the base, the panel mounting frame comprising a bearing member which is configured to support a solar panel thereon such that the solar panel slopes downwardly towards the front edge region of the base;
- wherein the base includes at least one recess for receiving a ballast to stabilise the support device on the surface, and wherein at least one of the front and rear edge regions of the base is configured to engage a flexible fastening member for attachment to the surface;
- wherein the base comprises an opening of a generally elongate form which extends between the front and rear regions of the base;
- wherein the opening is located within an area of a vertical projection of the mounting frame onto the base;
- wherein the dimensions of the opening are at least the dimensions of a vertical projection of the bearing member onto the base;
- wherein the at least one recess for receiving the ballast is located within an area of a vertical projection of the panel mounting frame onto the base;
- wherein the at least one recess for receiving the ballast is formed as a cavity in the base, the cavity being upwardly open for receiving the ballast from above;
- wherein the at least one recess for receiving the ballast is elongated and extends between a front and a rear edge region of the base and at a lateral side of the mounting frame;
- wherein the base includes two ballast-receiving recesses spaced apart from each other laterally on opposite sides of the panel mounting frame;
- wherein the base of the support device has one of a generally flat underside and footings for seating stably on the surface, and wherein the at least one recess for receiving the ballast has a tray-like configuration; and
- wherein the panel mounting frame is arranged substantially centrally of the base.

12. A support device for supporting a solar panel, comprising:
- a base adapted to rest on a surface, wherein the base comprises a front edge region and a rear edge region; and
- a panel mounting frame coupled to the base, the panel mounting frame comprising a bearing member which is configured to support a solar panel thereon such that the solar panel slopes downwardly towards the front edge region of the base;
- wherein the base includes at least one recess for receiving a ballast to stabilise the support device on the surface, and wherein at least one of the front and rear edge regions of the base is configured to engage a flexible fastening member for attachment to the surface;
- wherein the base comprises an opening of a generally elongate form which extends between the front and rear regions of the base;
- wherein the opening is located within an area of a vertical projection of the mounting frame onto the base;
- wherein the dimensions of the opening are at least the dimensions of a vertical projection of the bearing member onto the base; and
- further comprising an opening in the base configured to receive the panel mounting frame of an identical support device, such that one support device nests with the other in a stacked arrangement.

13. A support device for supporting a solar panel, comprising:
- a base adapted to rest on a surface, wherein the base comprises a front edge region and a rear edge region; and
- a panel mounting frame coupled to the base, the panel mounting frame comprising a bearing member which is configured to support a solar panel thereon such that the solar panel slopes downwardly towards the front edge region of the base;
- wherein the base includes at least one recess for receiving a ballast to stabilise the support device on the surface, and wherein at least one of the front and rear edge regions of the base is configured to engage a flexible fastening member for attachment to the surface;
- wherein the base comprises an opening of a generally elongate form which extends between the front and rear regions of the base;
- wherein the opening is located within an area of a vertical projection of the mounting frame onto the base;
- wherein the dimensions of the opening are at least the dimensions of a vertical projection of the bearing member onto the base; and
- further comprising a flexible fastening member, which extends through the base.

* * * * *